(12) United States Patent
Stapleton

(10) Patent No.: US 10,591,365 B2
(45) Date of Patent: Mar. 17, 2020

(54) TEMPERATURE PROBE

(71) Applicant: LumaSense Technologies Holdings, Inc., Santa Clara, CA (US)

(72) Inventor: Terry M. Stapleton, Santa Clara, CA (US)

(73) Assignee: LumaSense Technologies Holdings, Inc., Santa Clara, CA (US)

( * ) Notice: Subject to any disclaimer, the term of this patent is extended or adjusted under 35 U.S.C. 154(b) by 169 days.

(21) Appl. No.: 15/710,548

(22) Filed: Sep. 20, 2017

(65) Prior Publication Data

US 2018/0080835 A1    Mar. 22, 2018

Related U.S. Application Data

(60) Provisional application No. 62/397,135, filed on Sep. 20, 2016.

(51) Int. Cl.
*G01K 11/32* (2006.01)
*G01K 1/14* (2006.01)

(52) U.S. Cl.
CPC .............. *G01K 11/32* (2013.01); *G01K 1/14* (2013.01); *G01K 11/3213* (2013.01)

(58) Field of Classification Search
CPC ...... G01K 11/32; G01K 1/14; G01K 11/3213; G01J 5/0205; G01J 5/021
See application file for complete search history.

(56) References Cited

U.S. PATENT DOCUMENTS

| 4,075,493 A | 2/1978 | Wickersheim |
| 4,448,547 A * | 5/1984 | Wickersheim ............ G01J 5/48 |
| | | 250/337 |

(Continued)

FOREIGN PATENT DOCUMENTS

| CN | 1928519 A | 3/2007 |
| JP | S61184428 A | 8/1986 |

(Continued)

OTHER PUBLICATIONS

Office Action issued in corresponding Korean Application No. 10-2018-7008470 dated Dec. 12, 2018, and English translation thereof (13 pages).

(Continued)

*Primary Examiner* — Lisa M Caputo
*Assistant Examiner* — Philip L Cotey
(74) *Attorney, Agent, or Firm* — Osha Liang LLP

(57) ABSTRACT

A temperature probe for use in a chamber. The temperature probe includes a hollow standoff mounted on a floor of the chamber, and equipped with a side-hole. The temperature probe further includes a cap fixed to the top of the standoff. The bottom surface of the cap includes a coating. The temperature probe also includes a light pipe disposed perpendicularly to the standoff and a shield disposed around the light pipe. A top surface of the cap is co-planar with a bottom surface of an object whose temperature is being measured. A sensing end of the light pipe is inserted into the side-hole of the standoff. An opening in the shield allows transmission of light between the sensing end of the light pipe and the coating. The light pipe and the shield pass through a feed-through in a sidewall of the chamber.

14 Claims, 5 Drawing Sheets

(56) References Cited

U.S. PATENT DOCUMENTS

| | | | | |
|---|---|---|---|---|
| 4,652,143 | A * | 3/1987 | Wickersheim | G01K 11/3213 |
| | | | | 250/458.1 |
| 4,883,354 | A * | 11/1989 | Sun | G01D 5/268 |
| | | | | 356/128 |
| 5,791,782 | A * | 8/1998 | Wooten | G01K 1/143 |
| | | | | 374/163 |
| 5,876,119 | A * | 3/1999 | Ishikawa | G01J 5/041 |
| | | | | 374/134 |
| 5,893,643 | A * | 4/1999 | Kumar | H01L 21/67248 |
| | | | | 374/131 |
| 6,325,536 | B1 * | 12/2001 | Renken | G01K 11/3213 |
| | | | | 374/131 |
| 8,012,304 | B2 * | 9/2011 | Brillhart | H01L 21/67109 |
| | | | | 118/724 |
| 8,034,180 | B2 * | 10/2011 | Brillhart | H01L 21/67109 |
| | | | | 118/724 |
| 8,092,638 | B2 * | 1/2012 | Brillhart | H01L 21/6831 |
| | | | | 156/345.24 |
| 8,157,951 | B2 * | 4/2012 | Buchberger, Jr. | H01L 21/6831 |
| | | | | 118/696 |
| 9,554,738 | B1 * | 1/2017 | Gulati | A61B 5/1455 |
| 10,139,290 | B2 * | 11/2018 | Yamamoto | G01K 1/14 |
| 2003/0209773 | A1 * | 11/2003 | Lue | G01K 11/20 |
| | | | | 257/467 |
| 2008/0225926 | A1 | 9/2008 | Gotthold et al. | |
| 2009/0255921 | A1 * | 10/2009 | Ranish | H01L 21/67115 |
| | | | | 219/448.13 |
| 2012/0070136 | A1 * | 3/2012 | Koelmel | H01L 21/67115 |
| | | | | 392/416 |
| 2013/0180660 | A1 * | 7/2013 | Nozawa | H01J 37/32192 |
| | | | | 156/345.24 |
| 2016/0363486 | A1 * | 12/2016 | Yamamoto | G01K 1/14 |

FOREIGN PATENT DOCUMENTS

| | | |
|---|---|---|
| JP | 2005207997 A | 8/2005 |
| JP | 2013113614 | 6/2013 |
| JP | 2016076529 A | 5/2016 |

OTHER PUBLICATIONS

Office Action issued in corresponding Chinese Application No. 201780003418.X dated Jun. 5, 2019, and English translation thereof (14 pages).

Office Action issued in corresponding Japanese Application No. 2018-521960, dated Jan. 14, 2020 (5 pages).

* cited by examiner

TEMPERATURE PROBE

CROSS-REFERENCE TO RELATED APPLICATIONS

This application claims priority under 35 U.S.C. § 119(e) to U.S. Provisional Patent Application Ser. No. 62/397,135 filed on Sep. 20, 2016 and entitled "TEMPERATURE PROBE", the entire disclosure of which is hereby expressly incorporated by reference herein.

BACKGROUND

The measurement of temperature plays a critical role in many environments, including industrial applications. For example, in the semiconductor industry, semiconductor wafers, often made of silicon, may go through a process of ashing, also known as plasma ashing, in order to remove the photoresist used in etching the wafer. This process may take place in an ashing chamber where plasma may be created to heat the wafer to temperatures of 350° C. or more. The temperature measurements may further be performed in hostile environments, e.g., due to the presence of the plasma, high or low processors, extreme temperatures, etc. Temperature sensors that are compatible with these environmental conditions may therefore be necessary.

SUMMARY

In general, in one aspect, the invention relates to a temperature probe for use in a chamber. The temperature probe comprises: a hollow, opaque, insulating standoff mounted on a floor of the chamber, the standoff having a side-hole; a cap fixed to the top of the standoff, the bottom surface of the cap being coated with a coating; a light pipe disposed perpendicularly to the standoff; and a shield disposed around and coaxial with the light pipe, wherein a top surface of the cap is co-planar with a bottom surface of an object whose temperature is being measured, wherein a sensing end of the light pipe is inserted into the side-hole of the standoff, wherein the shield is opaque with an opening that allows transmission of light between the sensing end of the light pipe and the coating, the opening being aligned with the sensing end of the light pipe and the sensing end of the light pipe being polished at a 45-degree angle to the axis of the light pipe, and wherein the light pipe and the shield pass through a feed-through in a sidewall of the chamber.

In general, in one aspect, the invention relates to a thermocouple temperature probe for use in a chamber. The temperature probe comprises a hollow, opaque, insulating standoff mounted on a floor of the chamber, the standoff having a side-hole; a thermocouple; a cap fixed to the top of the standoff, the thermocouple fixed to a bottom surface of the cap; a shield disposed perpendicularly to the standoff, wherein a top surface of the cap is co-planar with a bottom surface of an object whose temperature is being measured, wherein the shield is inserted into the side-hole of the standoff, wherein wire leads of the thermocouple pass through the shield via the standoff, and wherein the shield passes through a feed-through in a sidewall of the chamber.

In general, in one aspect, the invention relates to a method for measuring a temperature of an object in a chamber using a fiber optic thermometry system, the system comprising: a phosphor temperature probe, the probe comprising: a hollow, opaque, insulating standoff mounted on a floor of the chamber, the standoff having a side-hole; a cap fixed to the top of the standoff, the bottom surface of the cap being coated with a phosphor; a light pipe disposed perpendicularly to the standoff; and a shield disposed around and coaxial with the light pipe, wherein a top surface of the cap is co-planar with a bottom surface of the object whose temperature is being measured, wherein a sensing end of the light pipe is inserted into the side-hole of the standoff, wherein the shield is opaque with an opening that allows transmission of light between the sensing end of the light pipe and the phosphor, the opening being aligned with the sensing end of the light pipe and the sensing end of the light pipe being polished at a 45-degree angle to the axis of the light pipe, and wherein the light pipe and the shield pass through a feed-through in a sidewall of the chamber; a fiber optic temperature instrument comprising a light source and a light detector; and a fiber optic cable optically disposed between the phosphor temperature probe and the fiber optic temperature instrument, the method comprising: generating a light pulse by the light source; propagating the light pulse to the phosphor, by the light pipe; exciting the phosphor with the light pulse; propagating, by the light pipe, light emitted by the excited phosphor to the light detector, measuring an intensity of the light emitted by the excited phosphor as a function of time; and converting the measured intensity as a function to time to a temperature.

DETAILED DESCRIPTION

Figure 1:
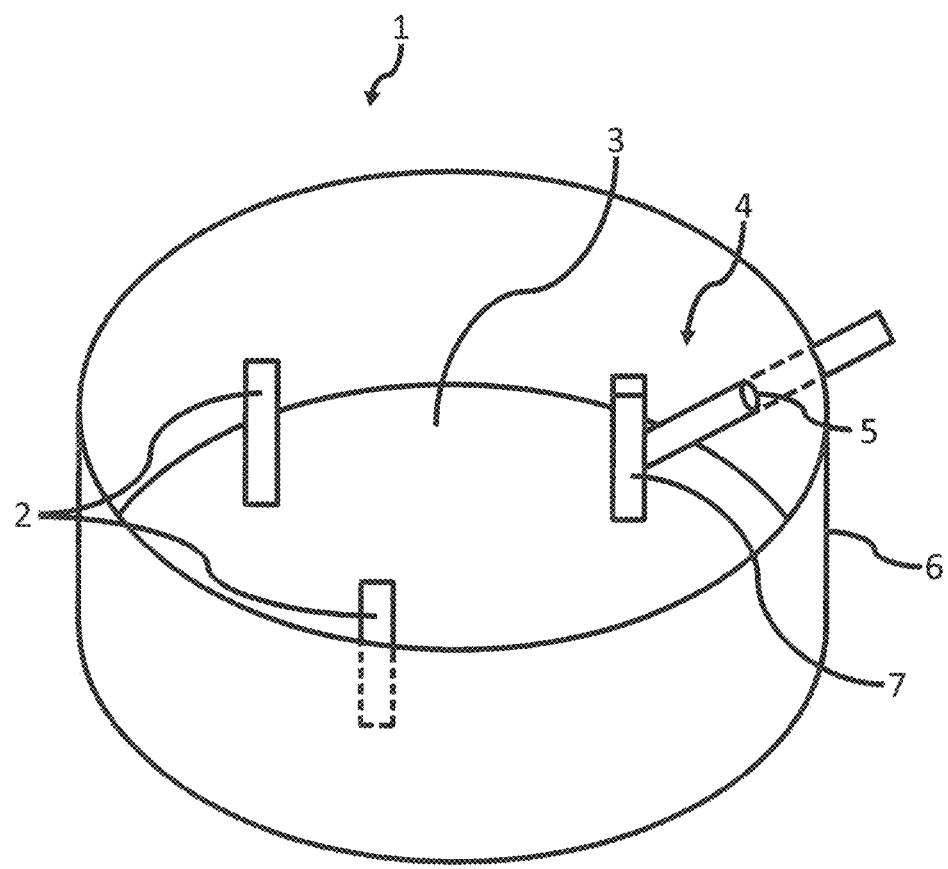
FIG. 1 is a schematic of an ashing chamber in perspective view, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first component is coupled to a second component, that connection may be through a direct connection, or through an indirect connection via other components, devices, and connections. Further, the terms "axial" and "axially" generally mean along or parallel to a central or longitudinal axis, while the terms "radial" and "radially" generally mean perpendicular to a central longitudinal axis.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

The present disclosure is of a device referred to as a temperature probe. More specifically, the present disclosure is directed to a temperature probe whose sensor surface also functions as a support for the object whose temperature is being monitored such as a semiconductor wafer, in accordance with one or more embodiments of the invention.

Referring to FIG. 1, in one or more embodiments, a plasma ashing chamber 1, or simply ashing chamber, may be used in the semiconductor industry as part of the production of semiconductor wafers (not shown). For instance, the ashing chamber 1 may be used to remove the photoresist from a wafer that has undergone etching. In this process the wafer 11 (shown in FIG. 3) may be heated in the ashing chamber 1 to 350° C. or more. These temperatures may be achieved and the cleaning of the wafer may be performed by creating plasma in the ashing chamber 1. An ashing chamber 1 is a cell, perhaps a cylindrical cavity, designed to hold a wafer at, for example, three points that determine a plane. However, the ashing chamber 1 may be in other shapes as well, without departing from the invention. The ashing chamber 1 may have a lid 8 (shown in FIG. 3), that when closed provides a gas-tight seal. The three points may be two quartz pins 2 mounted on and essentially orthogonal to the floor 3 of the ashing chamber 1 and a temperature probe 4 passing through a feed-through 5 in a side-wall 6 of the ashing chamber 1. The temperature probe 4 may make a gas-tight seal with the feed-through 5. The gas-tight seal may be produced with gaskets, o-rings, or other means known in the art. The temperature probe may include a standoff 7 that is mounted on and essentially orthogonal to the floor 3. The temperature probe 4 will be addressed in greater detail below in conjunction with FIGS. 4A-4C. In one or more embodiments, the ashing chamber 1 may be filled with helium, argon, xenon, or another noble gas. In one or more other embodiments, the ashing chamber 1 may be evacuated. The operating pressure of an evacuated ashing chamber 1 may be anywhere in a range between a few mTorr to multiple Torr. Alternatively, the ashing chamber may also be operated at atmospheric pressure, or even pressurized. The temperatures in the ashing chamber may exceed 200° C.

Figure 2:
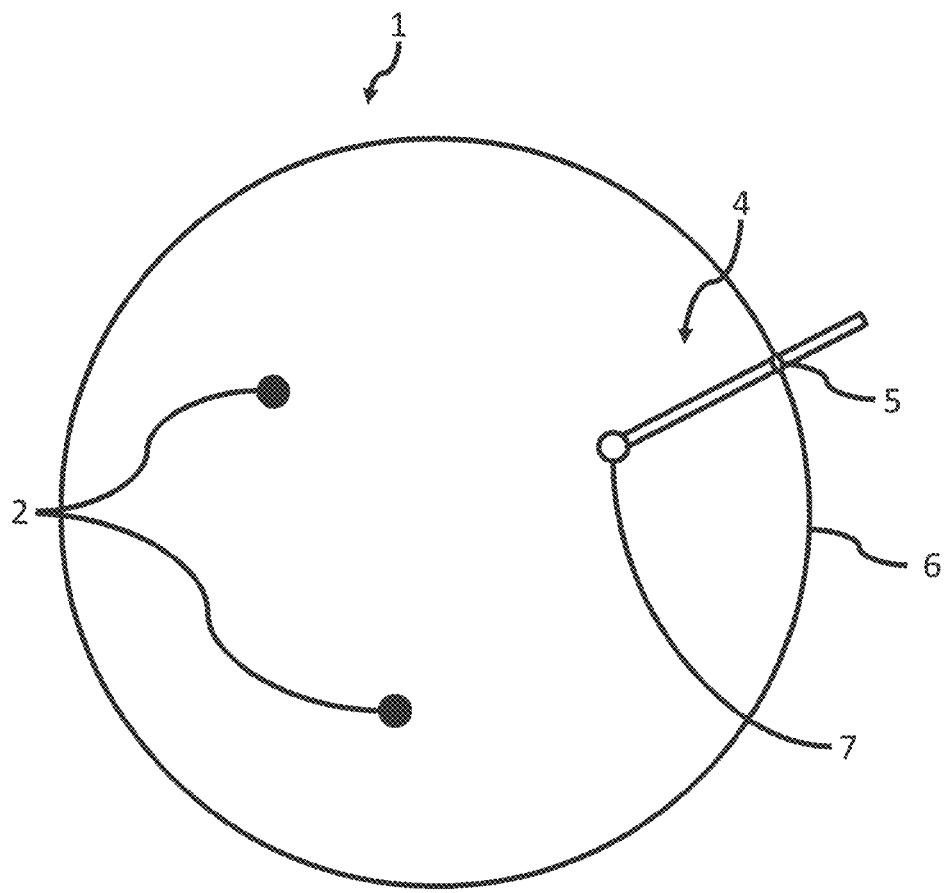
FIG. 2 is a schematic of an ashing chamber in plan view, in accordance with one or more embodiments of the invention.

FIG. 2 provides a schematic plan view of one or more embodiments of the ashing chamber 1 showing the relative positions of the quartz pins 2, the temperature probe 4, including the standoff 7 and the feed-through 5, which allows the temperature probe 4 to pass through the sidewall 6 of the ashing chamber 1.

Figure 3:
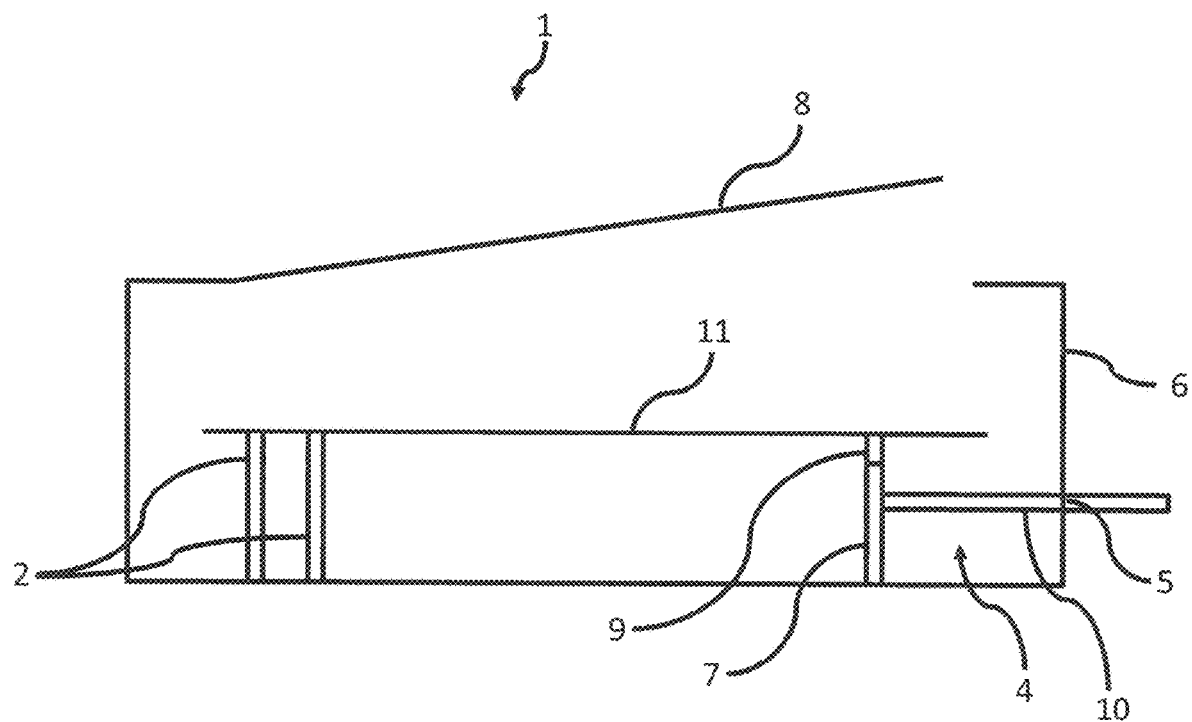
FIG. 3 is a schematic of an ashing chamber in side view, in accordance with one or more embodiments of the invention.

FIG. 3 offers a schematic side view of one or more embodiments. The ashing chamber 1 has an interior that may be accessible through a lid 8. In one or more embodiments, the temperature probe 4 includes a cap 9 fixed on the standoff 7 and a shield 10 that passes through the sidewall 6 via the feed-through 5. The cap 9 may also be referred to as a sensor. The cap 9 may be cylindrical in shape, with a top surface 13, a bottom surface 14, and a side surface, as further illustrated in FIG. 4A. In one or more embodiments, the top of the cap 9 may provide support for the semiconductor wafer 11. In addition, the top of the cap 9 may be co-planar with the bottom surface of the wafer 11, providing good thermal contact between them.

Figure 4A:
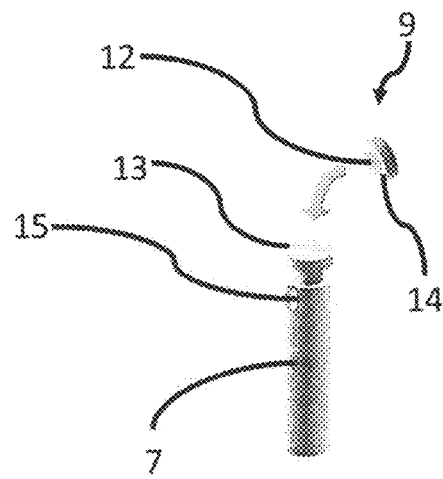
FIGS. 4A to 4C are schematic views of various parts of a temperature probe, in accordance with one or more embodiments of the invention.
Figure 4B:
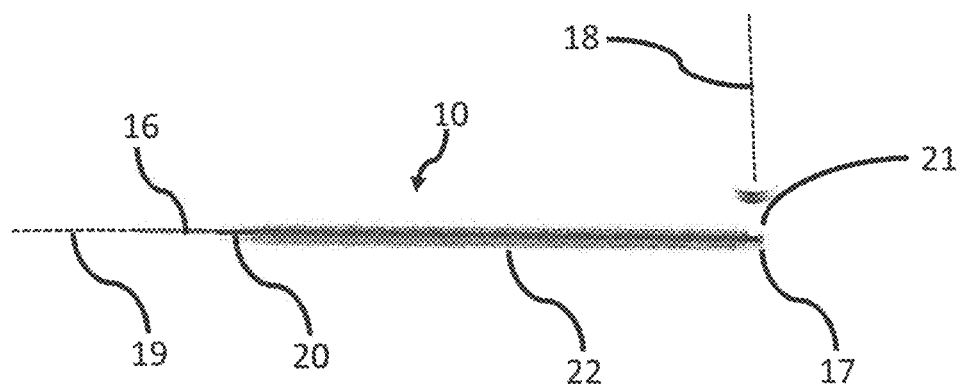
Figure 4C:
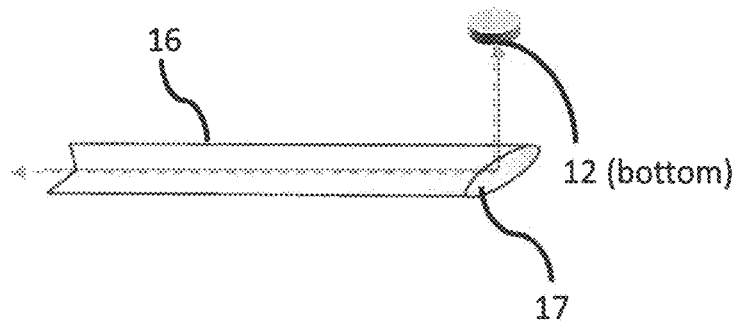

FIGS. 4A-4C provide greater detail of one or more embodiments of the temperature probe 4. In one or more embodiments, the temperature probe 4 may be a fiber optic temperature probe that relies on phosphor thermometry. Phosphor thermometry illuminates a phosphor with a pulse of light of a particular wavelength that excites the phosphor, causing it to emit light. The intensity of this emitted light decreases with time, having a characteristic decay time that is a function of temperature. Thus, by exciting the phosphor 12 and observing the decay of the emitted light, the temperature of the phosphor, and by extension, the temperature of what it is coating, may be determined.

Referring now to FIG. 4A, in one or more embodiments, a phosphor temperature probe 4 may include a hollow, opaque, insulating standoff 7. For the purposes of this disclosure, opaque is defined to mean opaque at the wavelength(s) of the radiation used in the measurement. The opacity of the standoff 7 is important to keep the temperature measurement from being corrupted by radiation from the plasma. The insulating property of the standoff 7 further isolates the interior of the standoff 7 from the effects of the plasma. Being insulating, the standoff also is a poor thermal conductor. Thus, heat from the wafer 11 is not drawn away into the standoff 7. As a result, the cap 9 may be able to follow the temperature of the wafer more responsively than if the standoff 7 were not a good insulator. The standoff is hollow to provide an optical path for both pulsed, stimulating radiation directed toward the phosphor 12 and the radiation emitted by the phosphor. A cap 9 may be fixed to the top of standoff 7. The cap 9 may be fixed using an adhesive, perhaps a ceramic adhesive. In one or more embodiments, the cap 9 comprises aluminum. Aluminum has a relatively low heat capacity and thus responds quickly to temperature changes of things to which it is exposed. In the case of an ashing chamber 1 in the semiconductor industry, the top 13 of cap 9 may be co-planar with the bottom surface of a wafer 11, providing both support for and good thermal contact with the wafer 11. The bottom 14 of cap 9 may be coated with the phosphor 12. This coating may be applied with a binder, e.g., a chemical compound that is compatible with the temperature range to be measured. One skilled in the art will appreciate that alternatively the coating may include a temperature-sensitive fluorophore, without departing from the invention. Standoff 7 is provided with a side-hole 15 for light pipe insertion.

FIG. 4B presents one or more embodiments of a light pipe 16 of a phosphor temperature probe 4 along with features associated with the light pipe 16. In one or more embodiments, the light pipe 16 may comprise silica, quartz or sapphire. Alternatively, the light pipe may be a hollow tube. The sensing end 17 of the light pipe 16 may be inserted into the side-hole 15 in the standoff 7. In one or more embodiments, the sensing end 17 of the light pipe 16 may be polished at an angle of 45°. In case of a hollow tube being used as a light pipe 16, the light pipe may be equipped with a mirror at a 45° angle, and disposed at the sensing end 17.

In one or more embodiments, the axis 18 of cap 9 may be placed at a right angle with the axis 19 of the light pipe 16. Thus, the polished sensing end 17 of the light pipe 16 provides a reflecting surface to allow light to propagate from the light pipe 16 through the standoff 7 to the phosphor coating 12 and vice versa. Alternatively, a mirror will deflect the light to allow light to propagate from the light pipe 16 through the standoff. The light pipe 16 may be provided with a shield 10 to protect the pipe 16 from being degraded by exposure to plasma in the chamber and to minimize measurement noise that could be introduced by the plasma. The shield 10 may be disposed around and coaxial with the light pipe 16. The shield 10 may include a plurality of coaxial layers. The innermost layer of the plurality of coaxial layers may be a metal sheath 20. In one or more embodiments, the metal sheath 20 may be comprised of stainless steel. In other embodiments, a ceramic may be used instead of metal. The metal sheath 20 may have an opening 21 to allow optical communication with the phosphor 12. The shield 10 may also have a layer 22 of quartz that is disposed radially outward from the metal sheath 20. The layer 22 of quartz may protect the metal sheath 20 from the plasma generated during operation of the ashing chamber 1.

FIG. 4C shows the bidirectional propagation of light along the light pipe 16, reflecting off the polished sensing end 17 of the light pipe 16 and stimulating the phosphor 12.

The temperature probe 4 described above may, with slight modification, be used for pyrometry. Pyrometry measures the temperature of an object by passively observing the thermal radiation emitted by that object. Thermal radiation emitted by an object is a function of temperature. When the temperature probe 4 is based on pyrometry, the phosphor coating 12 is replaced with, for example, a blackbody coating or any other coating with a known emissivity.

In one or more embodiments, the temperature probe 4 may comprise a thermocouple (not shown). The thermocouple may be peened to the cap 9 and wire leads provided where the light pipe 16 may be for the phosphor and pyrometric temperature probes. The wire leads may then connect to appropriate instrumentation for converting the signal form the thermocouple into a temperature.

One or more embodiments of the present invention advantageously enclose the entire measurement path so that there is no direct plasma exposure to phosphor 12 at the bottom surface 14 of the cap 9. Another advantage of the temperature probe 4 is that it provides a fixed surface, the top surface 13 of the cap 9 that is co-planar with the bottom surface of the wafer 11. This ensures good, reproducible thermal contact with the wafer, and thus improves process consistency. The design may thus provide accurate and reliable temperature measurements over a long time, even when exposed to hostile environments.

Figure 5:
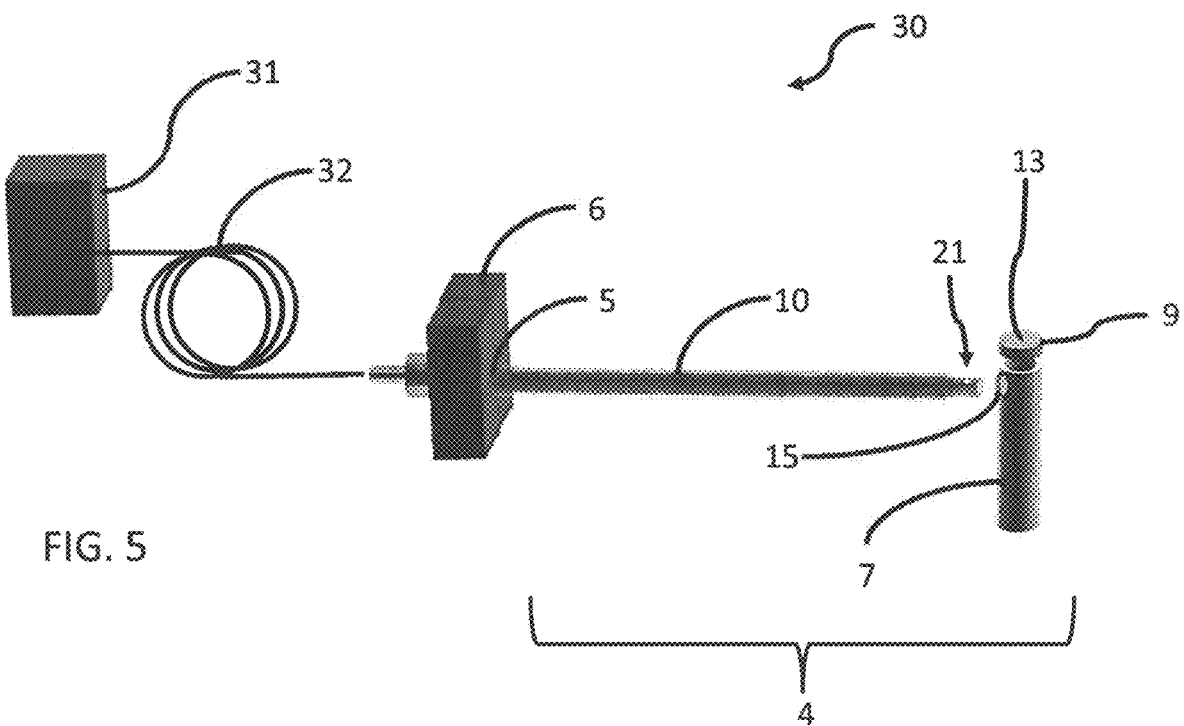
FIG. 5 is a perspective view of a fiber optic thermometry system, in accordance with one or more embodiments of the invention.

In one or more embodiments, the temperature probe 4 may be integrated into a fiber optic thermometry system 30. Referring to FIG. 5, a phosphor temperature probe 4 is shown. The phosphor temperature probe 4 may comprise a standoff 7 with a side-hole 15, a cap 9 whose top surface 13 supports and makes good thermal contact with a wafer (not shown). The phosphor temperature probe 4 may further comprise a light pipe 16 shielded by a shield 10 that includes a metal sheath 20 with an opening 21 surrounded by a quartz layer 22. The probe 4 makes a gas-tight seal at the side-wall 6 of the ashing chamber via the feed-through 5. The phosphor temperature probe 4 may connect to fiber optic temperature instrument 31 via a fiber optic cable 32. The fiber optic temperature instrument 31 may include a light source, a light detector, and a unit that converts detected light as a function of time into a temperature. The conversion may be based on fitting an exponential decay of the signal, with the characteristic time of the decay being a function of the temperature of the phosphor coating 12.

With a fiber optic thermometry system, different light sources and phosphors may be used to measure temperature in certain temperature ranges. Lasers or LEDs can be combined with compatible phosphors to satisfy measurement requirements. For example, a visible LED or laser may be matched with a phosphor to cover temperatures up to 400° C. These phosphors may be excitable by light of a particular wavelength or a range of wavelengths, located in an ultraviolet-near-infrared range.

A system similar to the one disclosed in FIG. 5 may also be used for pyrometric and thermocouple measurements.

In one or more embodiments, the temperature probe 4 may be integrated into a pyrometric system. With pyrometry, one may measure the thermal radiation emitted from the surface of an object in order to determine the surface temperature of the object. The thermal radiation emitted from the surface of the object increases as a function of surface temperature and is directly proportional to a property of the object or object's surface called emissivity. Emissivity is a measure of the effectiveness of an object or surface in emitting energy as thermal radiation. With the pyrometric system, passive observation of the observed object allows determination of temperature if the emissivity of the surface is known. Therefore, a light source is not required in the pyrometric system. A pyrometer sensor, e.g., an infrared radiation flux sensory may be used to directly measure the emissions by the blackbody coating, e.g., via the light pipe designed as a hollow tube.

A method of measuring temperature in a chamber according to one or more embodiments may be disclosed with reference to FIG. 5. In one or more embodiments, the light source of fiber optic instrument 31 may generate a light pulse. The light pulse may propagate through a fiber optic cable 32 to the light pipe 16 of the temperature probe 4. The light pulse may be reflected at the polished sensing end of the light pipe 16 toward the phosphor coating 12 on the cap 9. This color (or wavelength or frequency) of this light being pulsed may be selected in order to excite the phosphor coating 12. The phosphor coating 12, in response to the light pulse, may emit light with an intensity that decreases as a function of time. This light from the phosphor coating 12 may propagate back to the fiber optic instrument 31 where the intensity of the light emitted by the phosphor coating is measured by the light detector as a function of time. The fiber optic instrument 31 may then convert the detected light as a function of time into a temperature.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A temperature probe for use in a chamber comprising:
a hollow, opaque, insulating standoff mounted on a floor of the chamber, the standoff having a side-hole;
a cap fixed to the top of the standoff, the bottom surface of the cap being coated with a coating;
a light pipe disposed perpendicularly to the standoff; and
a shield disposed around and coaxial with the light pipe,
wherein a top surface of the cap is co-planar with a bottom surface of an object whose temperature is being measured,
wherein a sensing end of the light pipe is inserted into the side-hole of the standoff,
wherein the shield is opaque with an opening that allows transmission of light between the sensing end of the light pipe and the coating, the opening being aligned with the sensing end of the light pipe and the sensing end of the light pipe reflects light from the light pipe to the cap and vice versa by being polished at a 45-degree angle to the axis of the light pipe, and
wherein the light pipe and the shield pass through a feed-through in a sidewall of the chamber.

2. The temperature probe according to claim 1, wherein the cap is comprised of aluminum.

3. The temperature probe according to claim 1, wherein the light pipe comprises at least one selected from a group consisting of silica, quartz and sapphire.

4. The temperature probe according to claim 1, wherein the light pipe is a hollow tube.

5. The temperature probe according to claim 1, wherein the shield comprises a plurality of coaxial layers.

6. The temperature probe according to claim 1, wherein the innermost layer of the plurality of coaxial layers is a metal sheath and a layer of quartz is disposed radially outward from the metal sheath.

7. The temperature probe according to claim 6, wherein the metal sheath is comprised of stainless steel.

8. The temperature probe according to claim 1, wherein the feed-through makes a gas-tight seal with the shield.

9. The temperature probe according to claim 1, wherein the coating comprises a phosphor.

10. The temperature probe according to claim 9, wherein the phosphor is a member of a group consisting of phosphors that are excitable by light in an ultraviolet-near-infrared range.

11. A fiber optic thermometry system comprising:
the temperature probe according to claim 9;
a fiber optic temperature instrument comprising a light source and a light detector, and
a fiber optic cable optically disposed between the temperature probe and the fiber optic temperature instrument.

12. The temperature probe according to claim 1, wherein the coating comprises a blackbody coating of known emissivity.

13. A pyrometry system comprising:
the temperature probe according to claim 12; and
a detector that measures radiation emitted from the blackbody coating of known emissivity.

14. A method for measuring a temperature of an object in a chamber using a fiber optic thermometry system, the system comprising:
a phosphor temperature probe, the probe comprising:
a hollow, opaque, insulating standoff mounted on a floor of the chamber, the standoff having a side-hole;
a cap fixed to the top of the standoff, the bottom surface of the cap being coated with a phosphor,
a light pipe disposed perpendicularly to the standoff; and
a shield disposed around and coaxial with the light pipe,
wherein a top surface of the cap is co-planar with a bottom surface of the object whose temperature is being measured,
wherein a sensing end of the light pipe is inserted into the side-hole of the standoff,
wherein the shield is opaque with an opening that allows transmission of light between the sensing end of the light pipe and the phosphor, the opening being aligned with the sensing end of the light pipe and the sensing end of the light pipe reflects light from the light pipe to the cap and vice versa by being polished at a 45-degree angle to the axis of the light pipe, and
wherein the light pipe and the shield pass through a feed-through in a sidewall of the chamber;
a fiber optic temperature instrument comprising a light source and a light detector, and
a fiber optic cable optically disposed between the phosphor temperature probe and the fiber optic temperature instrument,
the method comprising:
generating a light pulse by the light source;
propagating the light pulse to the phosphor, by the light pipe;
exciting the phosphor with the light pulse;
propagating, by the light pipe, light emitted by the excited phosphor to the light detector,
measuring an intensity of the light emitted by the excited phosphor as a function of time; and
converting the measured intensity as a function to time to a temperature.

* * * * *